United States Patent [19]
Brod et al.

[11] 3,853,822
[45] Dec. 10, 1974

[54] POWDERED STOVING LACQUER
[75] Inventors: Gerd Brod, Grossauheim; Wilfried Felber, Grosswelzheim; Horst Leistner, Bruchkobel-Oberissigheim; Gerhard Morlock, Grossauheim, all of Germany
[73] Assignee: Deutsche Gold-und Silber-Scheideanstalt vormals Roessler, Frankfurt am Main, Germany
[22] Filed: July 24, 1973
[21] Appl. No.: 382,226

[30] Foreign Application Priority Data
July 26, 1972 Germany.............................. 2236513

[52] U.S. Cl.. 260/77.5 CR, 260/42.52, 260/63 UY, 260/80.73, 260/80.75, 117/132 B
[51] Int. Cl............................................. C08g 22/06
[58] Field of Search......... 260/80.73, 80.75, 63 UY, 260/77.5 CR, 77.5 TB

[56] References Cited
UNITED STATES PATENTS
3,542,741   11/1970   Hartmann et al.................. 260/77.5
3,676,405   7/1972   Labana........................ 260/77.5 CR Primary Examiner—Stanford M. Levin

[57] ABSTRACT

A powdered stoving lacquer comprising
  A. an acrylic resin prepared by free radical substance polymerization of
     a. about 35 – 60 percent by weight of at least one ester of methacrylic acid, the homopolymerization product of which has a glass transition temperature of at least about 80°C,
     b. about 5 – 40 percent by weight of at least one ester of acrylic acid or methacrylic acid, the homopolymerization product of which has a glass transition temperature below about 40°C, c. about 20 – 40 percent by weight of at least one hydroxyalkyl ester of acrylic acid of methacrylic acid, and
     d. about 0 – 10 percent by weight of at least one copolymerizable monomer selected from the group consisting of styrene, acrylonitrile, acrylamide, diacetone acrylamide, methacrylic acid and acrylic acid, and
  B. at least one aliphatic, cycloaliphatic or araliphatic diisocyanate or a monoadduct of such diisocyanate with a multivalent alcohol, the isocyanate groups in each case being blocked with a lactam having about 4 – 12 carbon atoms in the ring, in an amount of about 0.2 – 0.6 equivalents of isocyanate groups based on the content of hydroxyl groups in the acrylic resin.

26 Claims, No Drawings

POWDERED STOVING LACQUER

This invention relates to powdered stoving lacquers particularly suitable for the electrostatic powder coating of metals. The stoving lacquers are prepared by compounding acrylate resins containing hydroxyl groups with blocked isocyanates.

Pulverizable acrylate resins for electrostatic powder coating are known in the art. These resins can be prepared by the free-radical, substance polymerization of acrylic monomers, some of which contain hydroxyl groups, in the presence of mercaptans and blocked isocyanates. The mercaptans serve as chain transfer agents. For example, n-dodecyl mercaptan or tertiary dodecyl mercaptan can be employed. While these stoving lacquers can be applied as coatings to substrates, their adhesion to metal surfaces has not proved entirely satisfactory. Such lacquer coatings are particularly susceptible to the formation of cracks and chipping.

Accordingly, there exists a need in the art for a powdered stoving lacquer based on acrylate resins containing hydroxyl groups compounded with blocked isocyanates. The stoving lacquers should be suitable for application to metal substrates, and capable of forming coatings which exhibit good crack and chip resistance.

Accordingly, this invention provides a powdered stoving lacquer which comprises the reaction product of a free-radical, substance polymerization. More particularly, the powdered stoving lacquer of this invention comprises a polymerization product of a. about 35 – 60 percent by weight of at least one ester of methacrylic acid, the homopolymerization product of which has a glass transition temperature of at least about 80°C., b. about 5 – 40 percent by weight of at least one ester of acrylic acid or methacrylic acid, the homopolymerization product of which has a glass transition temperature below about 40°C., c. about 20 – 40 percent by weight of at least one hydroxyalkyl ester of acrylic acid or, preferably, methacrylic acid, and d. about 0 – 10 percent by weight of at least one other copolymerizable monomer seclected from the group consisting of styrene, acrylonitrile, acrylamide, diacetone acrylamide, methacrylic acid, and acrylic acid.

These monomers are polymerized in the presence of about 0.5 – 2.5 percent by weight, based on the total weight of the monomer mixture, of at least one thioglycolic acid ester of a bi-, tri- or tetravalent alcohol. About 0.2 – 0.6 equivalents of isocyanate groups, based on the content of the hydroxyl groups in the acrylate resin are compounded with the resin. The isocyanate groups are derived from at least one aliphatic, cycloaliphatic or araliphatic diisocyanate blocked with a lactam containing about 4 – 12 carbon atoms in its ring, or a blocked monoadduct of the diisocyanate with a multivalent alcohol.

The powdered stoving lacquers of this invention are capable of forming lacquer coatings which exhibit excellent lacquer-related characteristics, especially improved adhesion to metal substrates. These advantageous characteristics are obtained by the selection of certain acrylate monomers; i.e., the characteristics are based on the fact that monomer mixtures of a certain composition are polymerized, and further on the fact that certain selected blocked isocyanates are added to the acrylic resins, and particularly upon the use of specific chain-transfer agents as molecular weight regulators in the manufacture of the acrylate resins.

It is entirely surprising and unexplainable that the chain-transfer agents, which are present in the monomer mixture in only relatively small amounts, have a tremendous influence on the characteristics of the baked lacquer coatings.

The acrylate resins on which the powdered stoving lacquers of this invention are based are manufactured by the radical substance polymerization of a. about 35 – 60 percent by weight of at least one ester of methacrylic acid, the homopolymerization product of which has a glass transition temperature of at least about 80°. Preferred for use is methyl methacrylate.

Further examples are tert.-butyl methacrylate, neopentyl methacrylate or cyclohexyl methacrylate.

b. About 5 – 40 percent by weight of at least one ester of acrylic acid or of methacrylic acid, the homopolymerization product of which has a glass transition temperature below 40°C. To this category belong many alkyl esters of acrylic acid and methacrylic acid having about 2 – 10, preferably about 4 – 10, carbon atoms in the alkyl group. Examples are ethyl acrylate, n-butyl acrylate, hexyl acrylate, 2-ethyl hexylacrylate, n-octyl acrylate, and decyl acrylate as well as the similar esters of methacrylic acid. If esters having 2 or 3 carbon atoms in the alcohol component are used, their share of component b) should amount to a maximum of about 25 percent by weight.

c. About 20 – 40 percent by weight of at least one hydroxyalkyl ester of acrylic acid, or preferably, methacrylic acid. Typical are the esters having about 2 – 4 carbon atoms in the hydroxyalkyl group. Examples are the 2-hydroxy ethyl ester, 2-hydroxy propyl ester and 4-hydroxy butyl ester. When the hydroxy alkyl esters of acrylic acid are employed, their share of component c) should amount to a maximum of about 25 percent by weight.

d. about 0 – 10 percent by weight of at least one other copolymerizable monomer selected from the group consisting of styrene, acrylonitrile, acrylamide, diacetone acrylamide, methacrylic acid and acrylic acid.

The radical polymerization of the monomer mixture takes place in the presence of about 0.5 – 2.5 percent by weight, preferably about 1.0 – 2.0 percent by weight based on the total weight of the monomer mixture, of at least one conventional thioglycol acid ester of a bi-, tri-, or tetravalent alcohol. Especially preferred are the thioglycol acid esters of such alcohols, the molecular weights of which are about 62 – 200. Examples are ethylene glycol, 1,2-propylene glycol, 1,3-propylene glycol, 1,2-butylene glycol, 1,3-butylene glycol, 1,4-butylene glycol, glycerin, trimethylol propane or pentaerythrite, as well as di-, tri- or tetra ethylene glycol.

The polymerization can, for instance, be conducted in two steps; in the first step polymerization is conducted at temperatures of about 60° – 120°C., to form a syrupy preliminary polymerized product having a viscosity of, for example, about 3,000 centipoise. In a second step, the syrupy product is hardened by substance polymerization in flat individual molds, on a batch basis, or continuously, for example, according to the process disclosed in DT-AS 1 212 301, or between two endless steel bands, in layer thicknesses of a few millimeters up to a few centimeters at the most, at temperatures of about 70° – 100°C. Here provision should be made for adequate removal of the heat of polymerization such as by the use of air or water bath. In some cases, subsequent heating at about 100° – 120°C. is advantageous.

Known radical catalysts, especially peroxides and azo compounds having decomposition temperatures below about 100°C., can be used as polymerization catalysts. Typical of such compounds are tert-butylperpivalate, tert. butyl perisobutyrate, tert. butyl peroctoate, benzoyl peroxide, monochlorobenzoyl peroxide, dichlorobenzoyl peroxide, diacetyl peroxide, lauroyl peroxide, cyclohexanone hydroperoxide, diisopropyl peroxydicarbonate, cyclohexyl peroxydicarbonate, diisooctyl peroxydicarbonate, acetyl cyclohexyl sulfonyl peroxide, acetyl isopropyl sulfonyl peroxide, azo-bisisobutyric acid nitrile and azo-bis-(2,4-dimethyl) valeronitrile.

The powdered stoving lacquers of this invention contain as a reactive component about 0.2 – 0.6 equivalents of an isocyanate group based on the hydroxylgroup content of the acrylate resin. The isocyanate groups are derived from at least one aliphatic, cycloaliphatic or araliphatic diisocyanate blocked with a lactam having about 4 – 12 carbon atoms in its ring, or the blocked monoadduct of the diisocyanate from a multivalent alcohol.

Examples of suitable diisocyanates are hexamethylene diisocyanate, octamethylene diisocyanate, decamethylene diisocyanate, dodecamethylene diisocyanate, ω, ω'-diisocyanato-1,4-dimethyl benzene (p-xylene diisocyanate) and isophorone diisocyanate. Also well suited are the monoadducts of these diisocyanates with multivalent alcohols. Examples are the adducts from two moles of isophorone diisocyanate with one mole hexanediol, decane diol, tetraethylene glycol, neopentyl glycol and 1,4-bishydroxymethyl cyclohexane, and also the adducts from three moles of isophorone diisocyanate with one mole of trimethylol propane or hexanetriol.

The aliphatic, cycloaliphatic or araliphatic diisocyanates and their monoadducts with a multivalent alcohol are blocked at the isocyanate groups by a lactam having about 4 – 12 carbon atoms in the ring. Examples of suitable lactams are ε-caprolactam, butyrolactam, caprylolactam and laurinolactam. Epsilon-caprolactam is preferred.

Particularly preferred powdered stoving lacquers of this invention are those prepared from mixtures containing the adduct from two moles of isophorone diisocyanate with one mole of 1,6-hexanediol, wherein the adduct is blocked with ε-caprolactam. Also particularly preferred are the powdered stoving lacquers prepared from mixtures containing the adduct from two moles of isophorone diisocyanate with one mole of neopentylglycol wherein the adduct is blocked with ε-caprolactam, and also the adduct from three moles of isophorone diisocyanate and one mole of trimethylol propane, wherein the adduct is blocked with ε-caprolactam and further, the similarly ε-caprolactamblocked hexamethylene diisocyanate and p-xylene diisocyanate.

The powdered stoving lacquers of this invention can be prepared according to conventional techniques by homogenizing the blocked isocyanate with the acrylate resin in a melt, for instance in a kneader, at an elevated temperature of about 90°– 120°C.

After cooling, the resulting mixture can then be ground to a powder of the desired particle size, generally below about 100 microns.

The powdered stoving lacquers of this invention can also be manufactured in a particularly simple manner if the blocked isocyanate is added to the monomer mixture so that the subsequent polymerization occurs in the presence of the blocked isocyanate.

Conventional lacquer additives can be employed with the lacquers of this invention. Typical are the leveling agents, such as low molecular weight acrylates, polyesters, polyurethanes and polycaprolactone diols, and also pigments, such as the conventional titanium dioxide pigments. These can be compounded with the stoving lacquers of this invention in the customary amounts by employing conventional techniques. The compound is subsequently converted to a aprayable powder, which can then be applied by conventional electrostatic powder spraying methods to suitable metal surfaces. The lacquers can then be baked on the surfaces at temperatures of about 180°– 220°C. The resulting baked lacquers exhibit good adhesion on degreased, but otherwise untreated, steel sheets and other metals. The baked lacquers possess excellent mechanical properties, good gloss and outstanding weather resistance.

This invention will be more fully understood by reference to the following examples. All parts, proportions, ratios and percentages are by weight unless otherwise indicated.

EXAMPLE 1

In a mixture of 39 parts by weight of methyl methacrylate, 31 parts by weight of butyl acrylate, and 30 parts by weight of 2-hydroxyethyl methacrylate are dissolved 27 parts by weight of the adduct, blocked with ε-caprolactam, of isophorone diisocyanate and 1,6-hexandiol. To the solution are added 0.04 percent by weight of azo-bis-isobutyric acid nitrile and 1.25 percent by weight ethylene glycol dithioglycolate based on the monomer mixture.

In a suitable reaction vessel with agitator and reflux condenser, the monomer mixture if polymerized at 80°C. The reaction temperature is kept at 80 ± 2°C. by heating or by partial vacuum. After approximately 45 – 50 minutes a syrupy, pourable preliminary polymerized product is obtained, which is cooled. The resin is converted at approximately 40°C. with 0.3 percent by weight of lauroyl peroxide, and is hardened in a layer thickness of approximately 8 mm in a water bath at 75°C. for approximately one hour. It is subsequently tempered in a circulating-air oven at 110°C. for 2 hours. The polymerized product has a viscosity number (2 percent in dimethyl formamide/toluene 1:1) of 0.207 dl/g.

The obtained resin is broken up and homogenized with 30 percent titanium pigment (RN 57 P) in a kneader at temperatures of 100° to 120°C. The pigmented lacquer resin, which after cooling is ground to a particle size of 100μ, is sprayed in a commercial electrostatic spray installation at 60 kv. Standardized 0.88 mm thick automobile-body iron sheets which, before lacquering, have been degreased, are used as test metal sheets. The baking conditions in a circulating-air oven are 200°C., for 15 minutes. Results of tests to determine the technical characteristics of the lacquer are presented in Table 1.

In order to demonstrate the extremely great influence of the chain transfer agents employed as molecular weight regulators during polymerization upon the baked lacquer layers, Example 1 is repeated with several additional thioglycol acid esters of bito tetravalent alcohols and, for comparison, repeated with several other generally known chain transfer agents. In each instance, the regulators are employed in such concentrations that resins with approximately the same intrinsic viscosity are obtained. The type and amount of the regulators employed, the intrinsic viscosities of the obtained resins, and the results of the lacquer-characteristic tests are compiled in Table 1. The superiority of the resins manufactured with the use of thioglycol acid esters of bi- to tetravalent alcohols is very clearly noticeable.

The mixture is polymerized at 70°C. by adding 0.01 parts by weight of tert. butyl peroctoate. With constant external heating at 85°C., the reaction temperature rises within 10 minutes to 90°C. After a reaction period of 70 minutes the resin is converted at 40°C. with 0.3 parts by weight of diacetyl peroxide, and is hardened in a water bath at 75°C. for one hour in layers of 12 mm thickness. In order to reduce the residual monomer content, tempering in a circulating-air oven is subsequently carried out at 110°C. for 3 hours.

| Intrinsic viscosity: | 0.210 dl/g |
|---|---|
| Hydroxyl number: | 115 |

Table 1

| Test No. | Regulator | Weight % | η (dl/g) | GT | B 90 | Lacquer Characteristics ||| 
|---|---|---|---|---|---|---|---|---|
| | | | | | | ST(mm) | ET(mm) | SD(μ±15%) |
| 1 | Ethylene glycol dithioglycolate | 1.25 | 0.207 | 0–1 | ++ | 4r | 8 | 60 – 70 |
| 2 | Butanediol- 1,4- dithioglycolate | 1.35 | 0.209 | 1 | ++ | 4r | 8 | 70 – 80 |
| 3 | Tetraethylene glycol dithioglycolate | 1.90 | 0.219 | 0–1 | ++ | 4 | 8 | 60 – 70 |
| 4 | Glycerin tri- thioglycolate | 1.80 | 0.222 | 0–1 | ++ | 4p | 8 | 70 |
| 5 | Trimethylol propane tri- thioglycolate | 1.80 | 0.269 | 1 | ++ | 4p | 8 | 60 |
| 6 | Pentaerythrite tetrathio- glycolate | 2.00 | 0.196 | 0–1 | ++ | 4r | 8 | 60 |
| Comparison 1 | n-octylmercaptan | 0.90 | 0.203 | 4 | p | 2p | 5–7 | 60 – 70 |
| Comparison 2 | n-dodecylmercap- tan | 1.30 | 0.202 | 4 | p | 2p | 5–7 | 60 – 70 |
| Comparison 3 | tert.-dodecyl- mercaptan | 3.00 | 0.328 | 4 | p | 2p | 5–7 | 60 – 70 |
| Comparison 4 | pentanedithiol- (1,5) | 0.75 | 0.200 | 3 | p | 2p | 5–7 | 70 |
| Comparison 5 | diisopropyl xanthic disulfide | 1.25 | 0.246 | 0–1 | r | 3p | 5–7 | 70 |
| Comparison 6 | isooctanol thioglycolate | 1.50 | 0.202 | 4 | p | 3p | 5–7 | 60 – 70 |

Explanations:
r surface cracks
p chips off
++ surface without cracks

η intrinsic viscosity
GT Cross-hatching    DIN 53 151
B90 Bending by 90
ST Impact depression    DIN 53 156
ET Erichsen depression    DIN 53 156
SD Layer thickness

EXAMPLE 2

In a reaction vessel equipped with thermometer, agitator, and reflux condenser, a mixture of 44 parts by weight of methyl methacrylate, 26 parts by weight of 2-ethyl hexylacrylate, 20 parts by weight of 2-hydroxyethyl methacrylate and 10 parts by weight of 2-hydroxypropyl methacrylate is prepared in the presence of 1.5 parts by weight of a mixture of pentaerythrite tetrathioglycolate and ethylene glycol dithioglycolate at a ratio of 3 to 1.

(a) For the production of a pulverizable lacquer agent, 100 parts by weight of reactive acrylate resin are homogenized with 26.7 parts by weight of the adduct, blocked with ε-caprolactam, of isophorone diisocyanate and hexanediol (i.e., 0.3 equivalents of isocyanate groups per hydroxyl group of the resin) and 50 parts by weight of titanium white in a melt at 110°C., by means of a kneader. The solidified lacquer melt is subsequently broken up, finely ground and sifted. The portion of particles below 100 μ is used for electrostatic powder coating degreased steel sheets. The powder coated sheets are baked at 200°C. for 15 minutes in a circulating air-oven.

Testing of glossy, 70 μ thick lacquer films yields the following results:

| | |
|---|---|
| Erichsen depression | 7.7 mm |
| Cross-hatching | 1 |
| Bending at 90° | No cracks | b. For the production of an electrostatically sprayable lacquer powder, 100 parts by weight of the hydroxyl-containing acrylate resin are homogenized with 13.6 parts by weight of hexamethylene diisocyanate blocked with ε-caprolactam (i.e., 0.3 equivalent isocyanate groups per hydroxyl group of the resin) and 50 parts by weight of titanium dioxide pigment in the melt at 110° C., by means of a kneader. The solidified lacquer melt is subsequently broken up, finely ground and sifted. The grain portion below 100 μ is used for the electrostatic powder coating of degreased stainless steel sheets. After baking at 200°C. for 15 minutes, glossy, flexible and well-adhering lacquer films are obtained.

| | |
|---|---|
| Layer thickness: | 7 |
| Erichsen depression | more than 8 mm |
| Cross-hatching | 1 |
| Bending by 90° | No cracks |

COMPARISON TEST 7

Example 2 is repeated, however, with the multifunctional thioglycol acid ester replaced by 1.2 percent by weight of n-dodecylmercaptan.

The obtained resin possesses an intrinsic viscosity of 0.226 dl/g.

The manufacture of a powdered lacquer as well as lacquer coatings is conducted in the manner described in Examples 2(a) and 2(b).

The baked lacquer films chip off the metal surface during the bending test.

EXAMPLE 3

As described in Example 2, a preliminary polymerization product is produced from a monomer mixture consisting of 35 parts by weight of methyl methacrylate, 10 parts by weight of styrene, 30 parts by weight of butyl acrylate, and 25 parts by weight of 2-hydroxypropyl methacrylate, with the addition of 2.0 parts by weight of a mixture of ethylene glycol dithioglycolate and pentaerythrite-tetrathioglycolate at a ratio of 1:3. Initiation of the polymerization takes place at 70°C. with 0.07 percent by weight, in terms of the monomers, of azo-bis-isobutyric acid nitrile. The reaction temperature rises to a maximum of 115°C. After 40 minutes of polymerization, cooling is commenced and post catalyzation takes place at 40°C. with 0.4 parts by weight of a mixture of lauroyl peroxide and tert. butyl peroctoate in a ratio of 1:2.

Hardening of the preliminary polymerization product takes place in a layer thickness of approximately 8 mm in a water bath with 60 minutes. The tempering period at 110°C. is 180 minutes. The resin has an intrinsic viscosity of 0.268 dl/g and a hydroxyl number of 80.

For the manufacture of a pigmented lacquer resin, 200 parts of acrylate resin are homogenized in a kneader at 110°C. with 50 parts of the ε-caprolactam blocked adduct from isophorone diisocyanate and decandiol, and 120 parts titanium white. The lacquer melt is reworked into an electrostatically sprayable powder by grinding and sifting. Degreased steel sheets are electrostatically coated with the lacquer powder. The films baked at 220°C. for 15 minutes are glossy, flexible and adhesive to the steel. The deep-drawing strength is 8 mm, the cross-hatching has a coefficient of GT 0 - 1, and rapid bending of the sheets by 90° does not damage the lacquer surface.

COMPARISON TEST 8

For comparison, Example 3 is repeated with the use of 1.25 per cent by weight of n-dodecylmercaptan instead of the thioglycol acid ester.

The obtained acrylate resin has an intrinsic viscosity of 0.250 dl/g. If a powdered lacquer as described in Example 3 is manufactured from the obtained resin, lacquer films are obtained which chip off the metal base during the bending test.

EXAMPLE 4

Under the conditions of Example 3, a mixture consisting of 35 parts by weight of methyl methacrylate, 30 parts by weight of 2-ethyl hexylacrylate, 20 parts by weight of 2-hydroxypropyl methacrylate, 5 parts by weight of 2-hydroxyethyl methacrylate, 10 parts by weight of acrylonitrile and 1.8 parts by weight of tetraethylene glycol-dithioglycolate is polymerized. 0.11 part by weight of azo-bis-(2,4-dimethyl)-valeronitrile is used as the initiator. The amount of initiator is halved, and each half is dissolved in methyl methacrylate. The first portion is added to the reaction mixture at 70°C. while the temperature of the reaction container is kept constantly at 85°C. After 35 minutes the remaining amount is added at a reaction temperature of 87°C. After another 20 minutes the preliminary polymerization product is cooled to 40°C., is reacted with a peroxide mixture consisting of 0.13 parts by weight of lauroyl peroxide and 0.26 parts by weight of tert. butyl peroctoate, is hardened in individual molds in a water bath, and is tempered in a circulating-air oven.

The acrylate resin has an intrinsic viscosity of 0.229 dl/g.

For the manufacture of an electrostatically sprayable lacquer resin, 200 parts by weight of the acrylate resin are mixed in a kneader at 100°C. with 54 parts by weight of the isophorone diisocyanate adduct, blocked with ε-caprolactam, of hexanediol, and with 120 parts by weight of titanium white. The cooled melt is pulverized and is sifted fractionally.

The test lacquer coatings yield glossy, adhesive, flexible films having a deep-drawing strength of 8 mm, a cross-hatching of GT 0 - 1. The breaking resistance tested by rapid bending of the test sheets by 90° is good; the surface remains undamaged.

COMPARISON TEST 9

For comparison, Example 4 is repeated, with the difference that instead of tetraethylene glycol dithioglycolate, n-dodecylmercaptan is used. Production of the powdered lacquer takes place as described in Example 4. The test lacquer applications yield lacquer films with low bending strength. The lacquer surface chips off during the bending test.

What is claimed is:

1. A powdered stoving lacquer comprising:
   A. an acrylic resin reaction product from the free radical substance polymerization of a monomer mixture comprising:
      a. about 35 – 60 percent by weight, based on the weight of the monomer mixture, of at least one ester of methacrylic acid, the homopolymerization product of which has a glass transition temperature of at least about 80°C,
      b. about 5 – 40 percent by weight, based on the weight of the monomer mixture, of at least one ester of acrylic acid or methacrylic acid, the homopolymerization product of which has a glass transition temperature below about 40°C,
      c. about 20 – 40 percent by weight, based on the weight of the monomer mixture, of at least one hydroxyalkyl ester of acrylic acid or methacrylic acid, and
      d. about 0 – 10 percent by weight, based on the weight of the monomer mixture, of at least one copolymerizable monomer selected from the group consisting of styrene, acrylonitrile, acrylamide, diacetone acrylamide, methacrylic acid and acrylic acid, and
      e. about 0.5 – 2.5 percent by weight, based on the total weight of the monomer mixture, of at least one thioglycolic acid ester of a bi-, tri- or tetravalent alcohol;
   and
   B. at least one aliphatic, cycloaliphatic or araliphatic diisocyanate or a monoadduct of such diisocyanate with a multivalent alcohol, the isocyanate groups in each case being blocked with a lactam having about 4 – 12 carbon atoms in the ring, in an amount of about 0.2 – 0.6 equivalents of isocyanate groups based on the content of hydroxyl groups in the acrylic resin.

2. Stoving lacquer according to claim 1 in which component (a) is methyl methacrylate.

3. Stoving lacquer according to claim 2 in which component (c) is a hydroxyalkyl ester of methacrylic acid having about 2 – 4 carbon atoms in the hydroxyalkyl group.

4. Stoving lacquer according to claim 1 in which the thioglycolicacid ester is about 1.0 – 2.0 weight percent, based on the weight of the monomer mixture, of a compound selected from the group consisting of thioglycolic acid esters of ethylene glycol, 1,2-propylene glycol, 1,3-propylene glycol, 1,2-butylene glycol, 1,3-butylene glycol, 1,4-butylene glycol, glycerin, trimethylol propane, pentaerythrite, diethylene glycol, triethylene glycol and tetraethylene glycol.

5. Stoving lacquer according to claim 1 in which the blocked diisocyanate is blocked with ε-caprolactam.

6. Stoving lacquer according to claim 1 in which the diisocyanate is hexamethylene diisocyanate, octamethylene diisocyanate, decamethylene diisocyanate, dodecamethylene diisocyanate, ω, ω'-diisocyanate-1,4-dimethyl benzene (p-xylene diisocyanate and isophorone diisocyanate.

7. Stoving lacquer according to claim 1 in which the diisocyanate is an adduct selected from the group consisting of the adducts of two moles of isophorone diisocyanate with one mole of 1,6-hexanediol, two moles of isophorone diisocyanate with one mole neopentylglycol, three moles of isophorone diisocyanate with one mole trimethylol propane.

8. Stoving lacquer according to claim 3 in which component (b) is butyl acrylate and component (c) is 2-hydroxyethyl methacrylate.

9. Stoving lacquer according to claim 3 in which component (b) is 2-ethyl hexylacrylate and component (c) comprises 2-hydroxyethyl methacrylate and 2-hydroxypropyl methacrylate.

10. Stoving lacquer according to claim 3 in which component (b) is butyl acrylate, component (c) is 2-hydroxypropyl methacrylate and component (d) is styrene.

11. Stoving lacquer according to claim 9 in which component (d) is acrylonitrile.

12. Stoving lacquer according to claim 1 in which component (A) is neopentyl methacrylate or cyclohexyl methacrylate.

13. Stoving lacquer according to claim 1 in which component (B) is an alkyl ester of acrylic acid or methacrylic acid having about 2 – 10 carbon atoms in the alkyl group.

14. Stoving lacquer according to claim 13 in which the alkyl ester of acrylic or methacrylic acid has about 4 – 10 carbon atoms in the alkyl group.

15. Stoving lacquer according to claim 3 in which component (B) is ethyl acrylate, n-butyl acrylate, hexyl acrylate, 2-ethyl hexylacrylate, n-octyl acrylate, decyl acrylate, ethyl methacrylate, n-butyl methacrylate, hexyl methacrylate, 2-ethyl hexyl methacrylate, n-octyl methacrylate or decyl methacrylate.

16. Stoving lacquer according to claim 13 in which the ester of acrylic or methacrylic acid has 2 or 3 carbon atoms in the alcohol component, and the proportion of such esters having 2 or 3 carbon atoms does not exceed about 25 percent by weight of component (B).

17. Stoving lacquer according to claim 1 in which component (B) is a hydroxyalkyl ester of acrylic acid having about 2 – 4 carbon atoms in the hydroxyalkyl group.

18. Stoving lacquer according to claim 1 in which component (C) is a 2-hydroxy ethyl ester, 2-hydroxy propyl ester, or 4-hydroxy butyl ester of acrylic acid or methacrylic acid.

19. Stoving lacquer according to claim 1 in which component (C) is a hydroxy alkyl ester of acrylic acid, and the proportion of such hydroxy alkyl esters of acrylic acid in component (C) does not exceed about 25 percent by weight.

20. Stoving lacquer according to claim 1 in which the thioglycol acid ester is an ester of an alcohol, the molecular weight of which is about 62 – 200.

21. Stoving lacquer according to claim 1 in which the diisocyanate is an adduct of hexamethylene diisocyanate or p-xylene diisocyanate and trimethylol propane, said diisocyanate blocked with epsilon-caprolactam.

22. Stoving lacquer according to claim 1 in which the acrylic resin reaction product is prepared in two steps, the first step being the polymerization of the monomer mixture at a temperature of about 60°– 120°C to form a syrupy preliminary polymerized product; and the second step being hardening of the syrupy product at temperatures of about 70°– 100°C.

23. Stoving lacquer according to claim 22 in which the hardened syrupy product is subjected to a subsequent heating at about 100°– 120°C.

24. Stoving lacquer according to claim 22 in which the acrylic resin product is prepared in the presence of a radical catalyst selected from the group consisting of peroxides and azo compounds having decomposition temperatures below about 100°C.

25. Stoving lacquer according to claim 24 in which the catalyst is selected from the group consisting of : tertbutylperpivalate, tert. butyl perisobutyrate, tert. butyl peroctoate, benzoyl peroxide, monochlorobenzoyl peroxide, dichlorobenzoyl peroxide, diacetyl peroxide, lauroyl peroxide, cyclohexanone hydroperoxide, diisopropyl peroxydicarbonate, cyclohexyl peroxydicarbonate, diisooctyl peroxydicarbonate, acetyl cyclohexyl sulfonyl peroxide, acetyl isopropyl sulfonyl peroxide, azo-bis-isobutyric acid nitrile and azo-bis-(2,4-dimethyl) valeronitrile.

26. Powdered stoving lacquer according to claim 1 in which the monomer mixture includes component (B).

* * * * *